(12) United States Patent
Kanaida et al.

(10) Patent No.: US 6,566,426 B1
(45) Date of Patent: May 20, 2003

(54) AQUEOUS RESIN COMPOSITION

(75) Inventors: Kenta Kanaida, Shiga (JP); Makoto Mizushima, Suita (JP); Koichiro Saeki, Suita (JP); Takashi Miyai, Takatsuki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/200,254

(22) Filed: Jul. 23, 2002

(30) Foreign Application Priority Data

Nov. 22, 2001 (JP) ......................................... 2001-357811

(51) Int. Cl.⁷ .............................. C08K 5/35; C08K 3/10
(52) U.S. Cl. ......................................... 524/96; 524/413
(58) Field of Search ..................................... 524/96, 413

(56) References Cited

U.S. PATENT DOCUMENTS

| 4,474,923 A | 10/1984 | Keskey et al. |
| 4,972,018 A | 11/1990 | Leadbetter |
| 5,705,573 A | 1/1998 | Swanson et al. |
| 5,824,750 A | * 10/1998 | Weber et al. ............... 525/390 |

FOREIGN PATENT DOCUMENTS

| GB | 1 337 983 | 11/1973 |
| JP | 9-235320 | 9/1997 |
| JP | 11-138979 | 5/1999 |
| JP | 11-192778 | 7/1999 |

\* cited by examiner

*Primary Examiner*—Kriellion A. Sanders
(74) *Attorney, Agent, or Firm*—Roylance, Abrams, Berdo & Goodman, L.L.P.

(57) ABSTRACT

The present invention provides an aqueous resin composition, which has good driability, and which is excellent in adhesion and various resistances, particularly, water and solvent resistances. The aqueous resin composition comprises a combination of: an anionic resin and/or an amphoteric resin; a polyoxazoline compound; and a multivalent metal compound.

4 Claims, No Drawings

AQUEOUS RESIN COMPOSITION

BACKGROUND OF THE INVENTION

A. Technical Field

The present invention relates an aqueous resin composition that is excellent in driability, adhesion, and various resistances.

B. Background Art

In recent years, from the viewpoint of environmental problems such as air pollution, in fields of such as various printing inks, coatings, and adhesives, there are considered attempts to convert solvent compositions into aqueous compositions, wherein the solvent compositions have been widely used hitherto. However, the conventional aqueous compositions cannot be expected to have excellent driability. For example, in fields of printing in which plastic films as centrally intended for wrapping are used as base materials, the conventional aqueous compositions have problems in driability and wettability to the base materials, and almost all the conventional aqueous compositions are still impracticable except for some of uses.

As methods to improve the driability of the aqueous compositions, there may be thought of methods in which: the total solid content is increased, and the content of water-soluble components such as surfactants and thickeners is decreased so as to be as low as possible; or the drying is promoted by making the compositions contain a large quantity of low-boiling-point alcohols such as methanol. However, none of these methods could sufficiently satisfy the driability. In addition, in the case where the total solid content is increased, there is caused a problem such that the workability is easily damaged when the coating or soaking, and printing are carried out. On the other hand, in the case where the large quantity of low-boiling-point alcohols are used, there are problems such that: the air pollution is caused; the working environment is lowered; and it is necessary to install apparatuses for treating solvents.

In addition, also as to various resistances, such as water resistance and solvent resistance, and adhesion, the conventional aqueous compositions are inferior to the solvent compositions. Therefore, for example, when the aqueous compositions are used as inks, there is a case where there occur problems such that: the falling-off of the ink (color transferring) is caused; and the print is blotted with water or solvents.

SUMMARY OF THE INVENTION

A. Object of the Invention

Accordingly, an object of the present invention is to provide an aqueous resin composition, which has good driability, and which is excellent in adhesion and various resistances, particularly, water and solvent resistances.

B. Disclosure of the Invention

The present inventors diligently studied to solve the above-mentioned problems. As a result, they have completed the present invention by finding out that: when three components of an anionic resin and/or an amphoteric resin, a polyoxazoline compound, and a multivalent metal compound are allowed to coexist, the excellent driability can be caused by aggregation of the anionic resin and/or amphoteric resin with the polyoxazoline compound; and the adhesion and resistances, particularly, the water and solvent resistances, can be improved, because a complicated polymer matrix is formed by a stable covalent bond that is caused by a combination of the anionic resin or amphoteric resin with the polyoxazoline compound, or by a combination of the anionic resin or amphoteric resin with the multivalent metal compound, and further because the above polymer matrix is more firmly fixed by forming chelation of the multivalent metal in the polymer matrix with an anionic functional group of the anionic resin or amphoteric resin and with an oxazoline ring.

That is to say, an aqueous resin composition, according to the present invention, comprises a combination of: an anionic resin and/or an amphoteric resin; a polyoxazoline compound; and a multivalent metal compound.

These and other objects and the advantages of the present invention will be more fully apparent from the following detailed disclosure.

DETAILED DESCRIPTION OF THE INVENTION

The aqueous resin composition, according to the present invention, comprises the combination including the anionic resin and/or the amphoteric resin as an essential component.

There is no especial limitation of the aforementioned anionic resin if it is a resin having an anionic functional group, and synthetic resins or natural resins can be used. Examples thereof include: synthetic resins that are resins having a carboxyl group as the anionic functional group, such as ethylene-(meth)acrylic acid copolymer resins, vinyl acetate-(meth)acrylic acid copolymer resins, (meth)acrylate ester-(meth)acrylic acid copolymer resins, styrene-(meth) acrylic acid copolymer resins, styrene-butadiene copolymer resins, styrene-maleic anhydride copolymer resins, carboxyl-group-containing urethane resins, carboxyl-group-containing polyester resins, carboxyl-group-containing alkyd resins, and carboxyl-group-containing polyvinyl alcohol resins; and natural resins, such as carboxymethyl cellulose. In addition, carboxyl-group-containing complex resins, such as acrylic-modified polyesters, acrylic-modified polyurethanes, and acrylic-modified epoxy resins, can also be used. These anionic resins may be used either alone respectively or in combinations with each other.

Incidentally, the form of the aforementioned anionic resin may be either water-soluble, or water-dispersible in a form of colloidal dispersion or emulsion. In addition, the anionic resin may comprise a water-soluble anionic resin and a water-dispersible anionic resin together. Particularly, in the present invention, even if only the water-dispersible anionic resin is used, the excellent performance can be displayed because of including the polyoxazoline compound as an essential component.

Preferred examples of the anionic resin having a carboxyl group as the aforementioned anionic functional group include polymer resins as obtained by a process including the step of polymerizing a monomer component containing at least one unsaturated carboxylic acid.

The aforementioned unsaturated carboxylic acid is not especially limited, but examples thereof include: unsaturated monocarboxylic acids, such as (meth)acrylic acid, cinnamic acid, and crotonic acid; unsaturated dicarboxylic acids, such as maleic acid, itaconic acid, and fumaric acid; and their monoesters. These may be used either alone respectively or in combinations with each other. In addition, besides these unsaturated carboxylic acids, an unsaturated monomer copolymerizable with the above unsaturated carboxylic acid can also be used as the aforementioned monomer component. The unsaturated monomer copolymerizable with the unsaturated carboxylic acid is not especially limited, but examples thereof include: (meth)acrylate esters, such as methyl (meth)acrylate, butyl (meth)acrylate, and 2-ethylhexyl (meth)acrylate; unsaturated nitriles such as (meth)acrylonitrile; unsaturated amides, such as (meth) acrylamide and N-methylol(meth)acrylamide; vinyl esters, such as vinyl acetate and vinyl propionate; vinyl ethers, such as methyl vinyl ether and ethyl vinyl ether; α-olefins, such as ethylene and propylene; halogenated α,β-unsaturated monomers, such as vinyl chloride, vinylidene chloride, and vinyl fluoride; and α,β-unsaturated aromatic monomers such as styrene and α-methylstyrene. These may be used either alone respectively or in combinations with each other.

The polymerization method for the monomer component containing the aforementioned unsaturated carboxylic acid is not especially limited, but conventional polymerization methods can be applied thereto. For example, the polymerization method may be carried out by such as a solution polymerization method, emulsion polymerization method or suspension polymerization method. Specifically, the water-soluble anionic resin can be obtained by such as the solution polymerization method, and water-dispersible anionic resin can be obtained by such as the emulsion polymerization method or suspension polymerization method. In addition, the monomer component, for example, may be added to a reactor in a lump or may be continuously or gradually added thereto by a method such as dropwise addition. Furthermore, when the polymerization is carried out, the polymer resin may be partially crosslinked, if necessary, by using a monomer that has at least two copolymerizable unsaturated groups per molecule (e.g. divinylbenzene). In addition, the polymerization degree can also be controlled using chain transfer agents such as t-dodecylmercaptan. Incidentally, the polymerization is more favorably carried out under an atmosphere of inert gas such as nitrogen gas.

Preferred examples of the anionic resin having a carboxyl group as the aforementioned anionic functional group include urethane resins having a carboxyl group in their molecules, besides the above-mentioned polymer resins as obtained by the process including the step of polymerizing the monomer component containing the unsaturated carboxylic acid. The urethane resins having a carboxyl group in their molecules are not especially limited, but examples thereof include resins that are obtained from an active-hydrogen-containing compound and an organic polyisocyanate, and that have substantially no free isocyanate group.

The aforementioned urethane resins having a carboxyl group in their molecules can generally be obtained from the active-hydrogen-containing compound and the organic polyisocyanate, wherein the active-hydrogen-containing compound comprises at least one member selected from the group consisting of a low-molecular polyol, a high-molecular polyol, a hydroxycarboxylic acid, and a polyamine. At this time, it is favorable that at least the high-molecular polyol is used essentially as the active-hydrogen-containing compound. Specifically, for example, the urethane resin can be produced by such as a self-emulsification method including the steps of: polymerizing the organic polyisocyanate with such as the high-molecular polyol and hydroxycarboxylic acid as the active-hydrogen-containing compound; thereby preparing a prepolymer having isocyanate groups at both terminals; and further neutralizing a carboxyl group portion of the above prepolymer with a basic compound such as a tertiary amine (e.g. triethylamine) or sodium hydroxide; thereby giving a hydrophilic group into its molecular chain and dispersing the prepolymer into water; thereafter allowing the resultant prepolymer to react with a active-hydrogen-group-containing compound such as the polyamine or the low-molecular polyol. However, needless to say, the production method is not limited to the above method, and the urethane resins can also be produced by conventional polymerization methods. Incidentally, there is no limitation on the temperature when the polyurethane polymerization reaction is carried out, but the reaction is usually carried out at a temperature of 40 to 140° C., favorably 60 to 120° C. (however, in the case of the reaction with the polyamine, the reaction is usually carried out at a temperature of not higher than 80° C., favorably 0 to 70° C.). In addition, the polyurethane polymerization reaction may be carried out, for example, in a solvent, such as dimethylformamide, dioxane, toluene, xylene, methyl ethyl ketone, methyl isobutyl ketone, ethyl acetate, butyl acetate, or cellosolve acetate, and the above solvent may be added in the course of the reaction or after the reaction.

Examples of the low-molecular polyol that is an active-hydrogen-containilg compound aforementioned include: difunctional polyols, such as ethylene glycol, propylene glycol, 1,3- or 1,4-butanediol, 3-methylpentanediol, 1,6-hexanediol, neopentyl glycol, diethylene glycol, and cyclohexylene glycol; at least trifunctional polyols, such as glycerin, trimethylolpropane, pentaerythritol, sorbitol, and sucrose; and hydroxycarboxylic acids, such as lactic acid, tartaric acid, citric acid, salicylic acid, and dimethylolpropionic acid. Among these, the ethylene glycol, 1,4-butanediol, and dimethylolpropionic acid are favorable. In addition, monohydric alcohols (e.g. methanol, ethanol, propanol, butanol, 2-hydroxyethyl (meth)acrylate, and 2-hydroxypropyl (meth)acrylate) may partially be used together.

Examples of the high-molecular polyol that is an active-hydrogen-containing compound aforementioned include: polyether polyols, polyester polyols, polybutadiene polyols, hydrogenated polybutadiene polyols, acrylic polyols, polymer polyols, and mixtures of at least two of these polyols. Among these, particularly, the polyether polyols and the polyester polyols are favorable. Furthermore, specific examples of the aforementioned polyether polyols include: addition products of alkylene oxides to at least one member selected from the group consisting of the aforementioned low-molecular polyols, polyphenols (e.g. bisphenols such as bispheno A), and amines (e.g. alkanolamines, such as monoethanolamine, diethanolamine, triethanolamine, and N-methyidiethanolamine; aliphatic polyamines, such as ethylenediamine, hexamethylenediamine, isophoronediamime, and diethylenetriamine; and aromatic diamines, such as tolylenediamine and diphenylmethanediamine); and ring-opening-polymerized products of alkylene oxides. Examples of the alkylene oxides in the addition products of alkylene oxides include at least one alkylene oxide having 2 to 4 carbon atoms (e.g. ethylene oxide, propylene oxide, and butylene oxide), and they may be either random addition products or block addition products. Examples of the ring-opening-polymerized products of alkylene oxides include polytetramethylene ether glycols. In addition, examples of the aforementioned polyester polyols include: hydroxyl-group-terminated polyester polyols formed from polycarboxylic acids (e.g. aliphatic polycarboxylic acids, such as adipic acid, succinic acid, sebacic acid, azelaic acid, fumaric acid, maleic acid, and a dimerized linoleic acid; and aromatic polycarboxylic acids, such as phthalic acid, isophthalic acid, and terephthalic acid) and the aforementioned low-molecular polyols or polyether polyols (e.g. triethylene glycol and polyethylene glycol); lactone polyesters such as polycaprolactonediol; and polycarbonatediol. In addition, examples of the aforementioned polymer polyols include polyols as obtained by polymerizing vinyl monomers (e.g. acrylonitrile and styrene) in polyols (e.g. the aforementioned polyether polyols and polyester polyols).

Examples of the hydroxycarboxylic acid that is an active-hydrogen-containing compound aforementioned include: those which are aforementioned as examples of the aforementioned low-molecular polyol.

Examples of the polyamine that is an active-hydrogen-containing compound aforementioned include: aliphatic polyamines, such as ethylenediamine, tetramethylenediamine, hexamethylenediamine, and diethylenetriamine; alicyclic polyamines, such as 4,4'-diaminodicyclohexylmethane (hydrogenated MBA), 1,4-diaminocyclohexane, 4,4'-diaminomethyldicyclohexylmethane, and isophoronediamine; aliphatic aromatic-ring-having diamines, such as xylylenediamine and tertamethylxylylenediamine; aromatic polyamines, such as diphenylmethanediamine, dichlorodiphenylmethanediamine, tolylenediamine, diethyltolylenediamine, benzidine, and phenylenediamine; alkanolamines, such as mono- or diethanolamine, propanolamine, and N-hydroxyethylethylenediamine; polyalkylene oxide polyamines, such as compounds obtained by substituting amino groups for the terminal OH groups of the polyether polyols that are aforementioned as examples of the high-molecular polyol (e.g. polyoxyethylene ether diamines and polyoxypropylene ether diamines); and mixtures of at least two of these amines. Among these, the hexamethylenediamine, isophoronediamine, and 4,4'-diaminodicyclohexylmethane are particularly favorable.

Specific examples of the aforementioned organic polyisocyanate include: aliphatic polyisocyanates having 2 to 12 carbon atoms (except for carbon in the isocyanate (NCO) group), such as ethylene diisocyanate, tetramethylene diisocyanate, hexamethylene diisocyanate (HDI), dodecamethylene diisocyanate, 1,6,11-undecane triisocyanate, 2,2,4-trimethylhexane diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate; alicyclic polyisocyanates having 4 to 15 carbon atoms (except for carbon in the isocyanate (NCO) group), such as isophorone diisocyanate (IPDI), dicyclohexylmethane diisocyanate (hydrogenated MDI), cyclohexylene diisocyanate, methylhexylene diisocyanate (hydrogenated TDI), and bis(2-isocyanatoethyl) 4-cyclohexene-1,2-dicarboxylate; aromatic aliphatic polyisocyanates having 8 to 12 carbon atoms (except for carbon in the isocyanate (NCO) group), such as xylylene diisocyanate, tetramethylxylylene diisocyanate, and diethylbenzene diisocyanate, hydrated products of HDI, and trimers of IPDI or HDI; aromatic polyisocyanates having 6 to 20 carbon atoms (except for carbon in the isocyanate (NCO) group), such as tolylene diisocyanate (TDI), crude TDI, diphenylmethane diisocyanate (MDI), polyphenylmethane polyisocyanate (PAPI, namely, crude MDI), and naphthalene diisocyanate; modified products of the aforementioned polyisocyanates (e.g. modified products containing at least one member selected from among a carbodiimide group, an uretdione group, an uretimine group, a biuret group, and an isocyanurate group). Among these, the HDI, IPDI, hydrogenated MDI, and tetramethylxylylene diisocyanate are particularly favorable.

The glass transition temperature (Tg) of the aforementioned anionic resin is favorably in the range of –50 to 130° C., more favorably –10 to 100° C. In the case where the glass transition temperature (Tg) of the anionic resin is lower than –50° C., the resistance of the resin composition layer as formed tends to lower because of excessively softening a matrix. On the other hand, in the case where the glass transition temperature is higher than 130° C., the resin composition layer as formed tends to be fragile because of excessively hardening a matrix.

The acid value of the aforementioned anionic resin is favorably in the range of 1 to 800 mg KOH/g-solid, more favorably 3 to 240 mg KOH/g-solid. In the case where the acid value of the anionic resin is less than 1 mg KOH/g-solid, the formation of a matrix is insufficient, and the resistance of the resin composition layer as formed tends to lower. On the other hand, in the case where the acid value is more than 800 mg KOH/g-solid, particularly the water resistance tends to lower.

The weight-average molecular weight of the aforementioned anionic resin is favorably not smaller than 1,000, more favorably not smaller than 3,000, still more favorably not smaller than 5,000. In the case where the weight-average molecular weight of the anionic resin is smaller than 1,000, the increase of the molecular weight when a matrix is formed is insufficient, and the resistance of the resin composition layer as formed tends to lower.

The solid content (nonvolatile content) of the aforementioned anionic resin is not especially limited, but it is favorably in the range of 1 to 70 weight %, more favorably 10 to 50 weight %.

There is no especial limitation of the aforementioned amphoteric resin if this resin is a resin having an anionic functional group and a cationic functional group together. Examples thereof include the following 1) to 5). The amphoteric resin may be used either alone respectively or in combinations with each other. Incidentally, the amphoteric resin may also be water-soluble or water-dispersible similarly to the aforementioned anionic resin.

1) Amphoteric resins as obtained by introducing a carboxyl group as the anionic group into cationic resins (e.g. polyalkylenimines, such as polyethylenimine and polypropylenimine; polyvinylamines; polyallylamines; and polyamidoamines) by using such as chloroacetic acid.

2) Amphoteric resins as obtained by allowing a portion of carboxyl groups of carboxyl-group-having anionic resins (e.g. (meth)acrylic resins, polyester resins, polyurethane resins, alkyd resins, and maleated polybutadienes) to react with at least one of cationic-nitrogen-atom-having alkylating agents, of which the representative examples include: aziridine compounds, such as ethylenimine, propylenimine, hydroxyethylenimine, and hexamethlylene diethylene urea; glycidylamine; and salts of these compounds.

3) Amphoteric resins as obtained by allowing a glycidyl group of resins having a carboxyl group and a glycidyl group (e.g. (meth)acrylic resins) to react with ammonia or amine compounds.

4) Amphoteric resins comprised of polymers or copolymers as obtained from a monomer component including at least: a compound as obtained by allowing a glycidyl group of glycidyl-group-having compounds (e.g. glycidyl (meth)acrylate) to react with ammonia or amine compounds; and a carboxyl-group-having compound (e.g. (meth)acrylic acid, crotonic acid, and maleic acid).

5) Amphoteric resins comprised of copolymers as obtained from a monomer component including at least: at least one of cationic-nitrogen-atom-having compounds, such as amino-ester-group-having vinyl compounds (e.g. dialkylaminoalkyl (meth)acrylates), vinylpyridine or vinylimidazole or their salts, allylamine or diallylamine or their salts, and compounds as obtained by allowing a glycidyl group of glycidyl-group-having compounds (e.g. glycidyl (meth) acrylate) to react with ammonia or amine compounds (besides the aforementioned examples, the cationic-nitrogen-atom-having compounds may be resins having a cationic nitrogen atom in both of their main chains and side chains.); and at least one of carboxyl-group-having compounds (e.g. (meth)acrylic acid, crotonic acid, and maleic acid).

Any of the amphoteric resins as exemplified in the above 1) to 5) can be synthesized by conventional methods.

Neither the existing amount of the cationic functional group nor the existing amount of the anionic functional group in the aforementioned amphoteric resin is especially limited, but they are favorably in the range of 0.01 to 20 mmol per 1 g of the amphoteric resin respectively. In the case where the existing amount of the cationic functional group or anionic functional group is outside the aforementioned range, the adhesion to various base materials may be lowered.

Incidentally, a portion or all of the cationic functional groups of the aforementioned amphoteric resin may be neutralized with organic or inorganic acids, such as hydrochloric acid, nitric acid, formic acid, and acetic acid, or a portion or all of the anionic functional groups of the aforementioned amphoteric resin may be neutralized with organic or inorganic basic compounds, such as ammonia, amine compounds, and sodium hydroxide.

The glass transition temperature (Tg) of the aforementioned amphoteric resin is favorably in the range of −50 to 130° C., more favorably −10 to 100° C. In the case where the glass transition temperature (Tg) of the amphoteric resin is lower than −50° C., the resistance of the resin composition layer as formed tends to lower because of excessively softening a matrix. On the other hand, in the case where the glass transition temperature is higher than 130° C., the resin composition layer as formed tends to be fragile because of excessively hardening a matrix.

The weight-average molecular weight of the aforementioned amphoteric resin is favorably not smaller than 1,000, more favorably not smaller than 3,000, still more favorably not smaller than 5,000. In the case where the weight-average molecular weight of the amphoteric resin is smaller than 1,000, the increase of the molecular weight when a matrix is formed is insufficient, and the resistance of the resin composition layer as formed tends to lower.

The solid content (nonvolatile content) of the aforementioned amphoteric resin is not especially limited, but it is favorably in the range of 1 to 70 weight %, more favorably 10 to 50 weight %.

The aqueous resin composition according to the present invention comprises the combination further including the polyoxazoline compound as an essential component.

There is no especial limitation of the aforementioned polyoxazoline compound if it has at least two oxazoline rings per molecule. It may be either a low-molecular. compound or a polymer. Specific examples thereof include: low-molecular compounds, such as 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide, and bis-(2-oxazolinyinorbornane) sulfide; and oxazoline-ring-containing polymers. These polyoxazoline compounds may be used either alone respectively or in combinations with each other.

The aforementioned oxazoline-ring-containing polymer can easily be obtained by polymerizing a monomer component including an addition-polymerizable oxazoline as an essential component and, if necessary, further including a monomer copolymerizable with the above addition-polymerizable oxazoline.

Specific examples of the aforementioned addition-polymerizable oxazoline include 2-vinyl-2-oxazoline, 2-vinyl4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. Among these addition-polymerizable oxazolines, the 2-isopropenyl-2-oxazoline is more favorable because it is industrially easily available. These addition-polymerizable oxazolines may be used either alone respectively or in combinations with each other. The amount of the aforementioned addition-polymerizable oxazoline as used is not especially limited, but it is favorably not smaller than 5 weight %, more favorably in the range of 5 to 90 weight %, still more favorably 10 to 60 weight %, particularly favorably 30 to 60 weight %, of the monomer component. In the case where the amount of the addition-polymerizable oxazoline is smaller than 5 weight %, there is a possibility that, when a resin composition is prepared by combining the resultant oxazoline-ring-containing polymer with the aforementioned anionic resin and/or amphoteric resin, various resistances (e.g. durability, water resistance, and solvent resistance) of a cured product as obtained by curing the above resin composition may be lowered.

Specific examples of the monomer copolymerizable with the aforementioned addition-polymerizable oxazoline include: (meth)acrylate esters, such as methyl (meth) acrylate, ethyl (meth)acrylate, n-butyl (meth)acrylate, isobutyl (meth)acrylate, t-butyl (meth)acrylate, cyclohexyl (meth) acrylate, 2-ethylhexyl (meth)acrylate, methoxypolyethylene glycol (meth)acrylate, lauryl (meth)acrylate, stearyl (meth) acrylate, 2-hydroxyethyl (meth)acrylate, 2-hydroxypropyl (meth)acrylate, monoesterified products of (meth)acrylic acid and polyethylene glycol, 2-aminoethyl (meth)acrylate and its salts, caprolactone-modified (meth)acrylic acids, (meth)acrylic acid-2,2,6,6-tetramethylpiperidine, and (meth)acrylic acid-1,2,2,6,6-pentamethylpiperidine; (meth) acrylate salts, such as sodium (meth)acrylate, potassium (meth)acrylate, and ammonium (meth)acrylate; unsaturated nitriles, such as acrylonitrile and methacrylonitrile; unsaturated amides, such as (meth)acrylamide, N-methylol(meth) acrylamide, and N-(2-hydroxyethyl)(meth)acrylamide; vinyl esters, such as vinyl acetate and vinyl propionate; vinyl ethers, such as methyl vinyl ether and ethyl vinyl ether; α-oletins, such as ethylene and propylene; halogen-containing α,β-unsaturated aliphatic hydrocarbons, such as vinyl chloride, vinylidene chloride, and vinyl fluoride; and α,β-unsaturated aromatic hydrocarbons, such as styrene, α-methylstyrene, and sodium styrenesulfonate. These monomers may be used either alone respectively or in combinations with each other.

The aforementioned oxazoline-ring-containing polymer is favorably water-soluble, water-dilutable, or water-dispersible, and particularly it is more favorably water-soluble. In order to obtain the water-soluble oxazoline-ring-containing polymer, the ratio of a hydrophilic monomer in the monomer component as subjected to the polymerization is favorably not less than 50 weight %, more favorably in the range of 60 to 90 weight % from the viewpoint of water solubility and curability. Examples of the hydrophilic monomer include: the aforementioned addition-polymerizable oxazolines, 2-hydroxyethyl (meth)acrylate, methoxypolyethylene glycol (meth)acrylate, monoesterified products of (meth)acrylic acid and polyethylene glycol, 2-aminoethyl (meth)acrylate and its salts, sodium (meth)acrylate, ammonium (meth)acrylate, (meth)acrylonitrile, (meth)acrylamide, N-methylol(meth)acrylamide, N-(2-hydroxyethyl)(meth)acrylamide, and sodium styrenesulfonate. Among these, polyethylene-glycol-chain-having monomers (e.g the methoxypolyethylene glycol (meth)acrylate and the monoesterified products of (meth)acrylic acid and polyethylene glycol) are favorable because of high water solubility.

When the aforementioned oxazoline-ring-containing polymer is obtained, the polymerization method is not especially limited, but various conventional polymerization methods can be applied thereto. Examples thereof include solution polymerization, emulsion polymerization, and suspension polymerization in an aqueous medium, or bulk polymerization. The reaction conditions may be set according to such as composition of the monomer component, and it is not especially limited. For example, the reaction temperature is favorably in the range of about 20 to about 150° C., and the reaction time is favorably in the range of about 1 to about 24 hours. In addition, the monomer component, for example, may be added to a reactor in a lump or may be continuously or gradually added thereto by a method such as dropwise addition. Incidentally, the polymerization is more favorably carried out under an atmosphere of inert gas such as nitrogen gas.

Examples of the aqueous medium usable in the polymerization when the aforementioned oxazoline-ring-containing polymer is obtained include: water; and mixed solvents as obtained by blending water and solvents that are uniformly miscible with water. However, the water is particularly favorable. Specific examples of the solvents uniformly miscible with water include: lower alcohols, such as methyl alcohol, ethyl alcohol, n-propyl alcohol, isopropyl alcohol, n-butyl alcohol, and t-butyl alcohol; glycols, such as ethylene glycol, ethylene glycol monomethyl ether, ethylene glycol monobutyl ether, and diethylene glycol; and ketones, such as acetone and methyl ethyl ketone. These solvents uniformly miscible with water may be used either alone respectively or in combinations with each other. Incidentally, the amount of the aqueous medium as used in the polymerization when the aforementioned oxazoline-ring-containing polymer is obtained is not especially limited.

The aforementioned oxazoline-ring-containing polymer can be obtained also by introducing an oxazoline ring by post-modifying polymers. Specifically, the oxazoline-ring-containing polymer can be obtained by such as a method in which a nitrile-group-having polymer is allowed to react with a monoamino alcohol (JP-A-235320/1997), or a method in which monoethanolamine is allowed to react with an ester portion of a poly(methacrylate ester), and further an oxazoline ring is introduced by dehydrocyclization (U.S. Pat. No. 5,705,573).

The solid content (nonvolatile content) of the aforementioned polyoxazoline compound is not especially limited, but it is favorably in the range of 1 to 70 weight %, more favorably 10 to 50 weight %.

The oxazoline value of the aforementioned polyoxazoline compound is favorably in the range of 50 to 3,000 g-solid/eq., more favorably 100 to 2,000 g-solid/eq., still more favorably 200 to 1,500 g-solid/eq.

The combining ratio of the aforementioned polyoxazoline compound is favorably in the range of 0.1 to 99.9 weight %, more favorably 0.2 to 80 weight %, still more favorably 0.5 to 50 weight %, based on the total of the aforementioned anionic resin and/or amphoteric resin. In the case where the combining ratio of the polyoxazoline compound is less than 0.1 weight %, the adhesion of the formed resin composition layer to base materials is easily lowered. On the other hand, in the case where the combining ratio is more than 99.9 weight %, the resistance of the resin composition layer as formed is easily lowered.

The aqueous resin composition according to the present invention comprises the combination further including the multivalent metal compound as an essential component.

There is no especial limitation of the aforementioned multivalent metal compound if it can form a covalent bond with the anionic functional group or oxazoline ring that the aforementioned anionic resin or amphoteric resin has. Examples of its metal species include zirconium, zinc, boron, and titanium, and examples of its ligand include ammonium hydroxide, ammonium carbonate, ammonium carboxylates, carboxylic acids, and halides. Specific examples of compounds comprised of these metal species and ligands include ammonium zirconium carbonate, ammonium zirconium lactate, ammonium zirconium acetate, zirconium acetate, zirconium propionate, zirconium sulfate, zirconium nitrate, zirconium hydroxychloride, zirconium oxychloride, zirconium phosphate, zirconium potassium carbonate, zirconium ammonium fluoride, ammonium zinc carbonate, borate, titanium ammonium oxalate, and titanium ammonium carbonate. In addition, these compounds may be compounds stabilized by such as tartaric acid and gluconic acid. In the present invention, among these, the compound of which the metal species is zirconium, zinc, boron or titanium is especially favorable, and the zirconium compound is particularly favorable. These multivalent metal compounds may be used either alone respectively or in combinations with each other.

The combining ratio of the aforementioned multivalent metal compound is favorably in the range of 0.1 to 50 weight %, more favorably 0.2 to 40 weight %, still more favorably 0.5 to 35 weight %, based on the total of the aforementioned anionic resin and/or amphoteric resin with the polyoxazoline compound. In the case where the combining ratio of the multivalent metal compound is less than 0.1 weight %, the crosslinking density of a matrix is insufficient, and the water resistance and solvent resistance of the resin composition layer as formed are lowered. On the other hand, in the case where the combining ratio is more than 50 weight %, the crosslinking density of a matrix is too much, and the resin composition layer as formed tends to be fragile.

In the aqueous resin composition according to the present invention, it is favorable that the combination further includes a volatile basic compound. If the volatile basic compound is allowed to exist, the anionic functional group of the anionic resin and/or amphoteric resin can be protected to improve the storage stability until the composition is used. Then, this volatile basic compound easily volatilizes when the composition is used. Therefore, the protected anionic functional group rapidly contributes to forming a matrix, and the drying is promoted, and besides it results in giving the resistance.

Examples of the aforementioned volatile basic compound include ammonia, morpholine, alkylamines, 2-dimethylaminoethanol, N-methylmorpholine, and ethylenediamine. These may be used either alone respectively or in combinations with each other.

As to the combining ratio of the aforementioned volatile basic compound, the aforementioned volatile basic compound is favorably used so that the pH of the resin composition as adjusted by the volatile basic compound will be not less than 7. In the case where the pH of the resin composition as adjusted by the aforementioned volatile basic compound is less than 7, the storage stability of the resin composition cannot be improved sufficiently, and at the same time the adhesion and resistance of the resin composition layer as formed are easily lowered.

The aqueous resin composition, according to the present invention, may further comprise a cationic resin. If the cationic resin is allowed to exist, the cationic group of the above cationic resin, together with the oxazoline ring of the polyoxazoline compound, contributes to aggregation with the anionic resin and/or amphoteric resin and to chelation with the multivalent metal compound, whereby further improvement of various performances can be intended.

There is no especial limitation of the aforementioned cationic resin if it has a cationic functional group. Examples thereof include basic nitrogen-containing resins having an amino group as the cationic functional group, such as polyalkylenimines, polyamides, aminosulfopolyesters, polyallylamines, polyvinylamines, and their modified polymers. These cationic resins may be used either alone respectively or in combinations with each other. In addition, the forms of these cationic resins are not especially limited, but they are favorably aqueous solutions.

In general, the polyalkylenimines can be produced by such as: a method including the step of ionically polymerizing alkylenimines, such as ethylenimine, 1,2-propylenimine, 1,2-dodecylenimine, 1,1-dimethylethylenimine, phenylethylenimine, benzylethylenimine, hydroxyethylethylenimine, aminoethylethylenimine, 2-methylpropylenimine, 3-chloropropylethylenimine, methoxyethylethylenimine, dodecylaziridinyl formate, N-ethylethylenimine, N-(2-aminoethyl)ethylenimine, N-phenethylethylenimine, N-(2-hydroxyethyl)ethylenimine, N-(cyanoethyl)ethylenimine, and N-(p-chlorophenyl)ethylenimine; or a method including the steps of polymerizing alkyloxazolines, and thereafter partially or perfectly hydrolyzing the resultant polymer. However, there is no especial limitation thereto.

For example, the polyvinylamines can be obtained by such as: a method including the steps of polymerizing N-vinylformamide to produce poly(N-vinylformamide), and thereafter partially or perfectly hydrolyzing this polymer with acids such as hydrochloric acid or basic substances; or a method including the step of reducing polynitroethylene or its derivatives; or a method including the step of subjecting polyacrylamide to Hoffmann decomposition; or a method including the step of subjecting N-vinylphthalimide resins to alkaline reduction. However, there is no especial limitation thereto. Examples of the polyvinylamines include polyvinylamine, polymetavinylamine, polyvinylamine hydrochloride, polyvinylethylamine hydrochloride, polymetavinylmethylamine hydrochloride, and polyvinyl-N-trimethylammonium bromide.

The polyallylamines are generally obtained by polymerizing hydrochlorides of allylamine monomers, and thereafter removing hydrochloric acid, but there is no especial limitation thereto. Examples of the polyallylamines include polyallylamine, polyallylamine hydrochloride, polyallylethylamine hydrochloride, polyallyldimethylethylammonium hydrochloride, poly(diallylamine hydrochloride), poly(diallylmethylamine hydrochloride), poly(diallyldimethylammonium hydrochloride), copolymers of these polyallylamines with the following: sulfur-dioxide, acrylamide, diallylamine hydrochloride derivatives, and dimethylaminoethyl (meth)acrylate.

Examples of the polyamides include: polycondensed products as obtained by such as polycondensation, interfacial polycondensation, low-temperature solution polycondensation, polyphosphoric-acid-solution polycondensation, and solid-phase polycondensation including the steps of heating polyalkylene polyamines (e.g. hexamethylenediamine, 1,4-phenylenediamine, 1,3-phenylenediamine, diethylenetriamine, triethylenetetramine, tetraethylenepentamine, dipropylenepentamine, dipropylenetriamine, tripropylenetetramine, and dihexamethylenetriamine) together with dicarboxylic acids (e.g. adipic acid, isophthalic acid, terephthalic acid, succinic acid, maleic acid, glutaric acid, suberic acid, and sebacic acid) or their derivatives such as acid chlorides, and then removing formed water under reduced pressure; products obtained by polyaddition of diisocyanates and dicarboxylic acids; and ring-opening-polymerized products of lactams. However, there is no limitation to these.

The aminosulfopolyesters are, for example, obtained by dehydrocondensation including the steps of: heating polyalkanolamines (e.g. diethanolamine, N-methyldiethanolamine, and triethanolamine), diols (e.g. diethylene glycol, triethylene glycol, and 1,4-cyclohexanediol), dicarboxylic acids (e.g. adipic acid, isophthalic acid, terephthalic acid, succinic acid, maleic acid, glutaric acid, suberic acid, and sebacic acid), and 5-sodiosulfoisophthalic acid; and then removing formed water under reduced pressure. However, there is no limitation thereto.

Furthermore, crosslinked products as obtained by crosslinking the aforementioned at least two cationic resins with crosslinking agents can also be used. Examples thereof include crosslinked products as obtained by crosslinking polyalkylenimines and polyamides with such as epichlorohydrin, but there is no limitation thereto.

In addition, when the cationic resins are modified polymers, examples thereof include polymers as modified by such as ethylene oxide, propylene oxide, styrene oxide, $\alpha,\beta$-unsaturated esters in a modifying ratio of 0 to 100%.

The number-average molecular weight of the aforementioned cationic resin is not especially limited, but is favorably in the range of 300 to 5,000,000, more favorably 600 to 2,700,000, still more favorably 600 to 150,000, most favorably 1,000 to 120,000. In the case where the number-average molecular weight of the cationic resin is smaller than 300, the increase of the molecular weight when a matrix is formed is insufficient, and the resistance of the resin composition layer as formed tends to lower. On the other hand, in the case where the number-average molecular weight is larger than 5,000,000, the reaction when a matrix is formed is insufficient, and the water resistance of the resin composition layer as formed may be damaged.

When the aforementioned cationic resin is also included, the combing ratio thereof is not especially limited, but it is favorably not more than 10 weight % based on the total of the aforementioned anionic resin and/or amphoteric resin. In the case where the combining ratio cationic resin is more than 10 weight %, the resistance of the resin composition layer as formed tends to lower.

The aqueous resin composition, according to the present invention, may further comprise resins other than the aforementioned anionic resin, amphoteric resin, and cationic resin in such a range as not to hinder the effects of the present invention. There is no especial limitation on the other resins, and synthetic or natural resins can be used. Examples thereof include: synthetic resins (e.g. polyolefin resins and diene resins, such as polyethylene, ethylene-vinyl acetate copolymers, ethylene-(meth)acrylate ester copolymers, polypropylene, and propylene-butene copolymers; polystyrene resins, such as polystyrene and styrene-butadiene copolymers; polyvinyl acetate resins; (meth)acrylate ester resins; acrylonitrile resins; polyether resins, such as polyoxymethylene and polyphenylene ether resins; polycarbonate resins; polyester resins; unsaturated polyester reins; polyurethane resins; epoxy resins; and polyimide resins); and natural resins such as caseins.

The aqueous resin composition, according to the present invention, usually further comprises an aqueous medium besides the essential components, namely, the aforementioned anionic resin and/or amphoteric resin, the polyoxazoline compound, and the aforementioned multivalent metal compound. The aqueous medium is not especially limited, but a solvent consisting of water is the most favorable. In addition, for example, at least one low-boiling-point water-soluble organic solvent such as methanol and ethanol, or a mixed solvent including these solvents and water, can also be used.

The total solid content of the aqueous resin composition according to the present invention is favorable not less than 1 weight %. In the case where the total solid content of the resin composition is less than 1 weight %, the driability tends to be insufficient. Therefore, the combining ratio of the aforementioned aqueous solvent is favorably adjusted so that the total solid content of the resin composition will be not less than 1 weight %.

The aqueous resin composition, according to the present invention, may further comprise various additives, if necessary. Examples of the additives include: various organic or inorganic pigments; various dyes, such as acid dyes, direct dyes, reactive dyes, dispersive dyes, and food colors; plasticizers, waxes, moisture-holding agents, deformers, surfactants, humidifying agents, leveling agents, thickeners, rheology-improving agents, metal-ion-blocking agents, biocides, dispersants; extenders, such as calcium carbonate, talc, clay, silica, and silicates; fillers, freezing inhibitors, freezing and defreezing stabilizers, preserving agents, corrosion inhibitors, color-water-holding improvers, antistatic agents, antioxidants, ultraviolet inhibitors, and fluorescent whitening agents. The combining ratio of these additives may fitly be set in such a range as not to hinder the effects of the present invention.

The aqueous resin composition, according to the present invention, can be obtained by combining the aforementioned anionic resin and/or amphoteric resin, the polyoxazoline compound, and the aforementioned multivalent metal compound as essential components, and its production process is not especially limited. In detail, the aforementioned three essential components and the other component as used if necessary may be blended in any order by any method. For example, in consideration of the storage stability, it is permitted that: two of the aforementioned three essential components are beforehand blended, and then the residual one component is added thereto just before the use. A favorable form of the aqueous resin composition, according to the present invention, is a form including the aforementioned anionic resin and/or amphoteric resin, the polyoxazoline compound, and the aforementioned multivalent metal compound at the same time. That is to say, it is desirable that the three essential components are initially blended. Specifically, the aqueous resin composition, according to the present invention, can be produced by publicly known stirring, dispersing, or pulverizing apparatuses, such as stirrers (e.g. paddle blades), high-speed stirring dispersers, high-pressure homogenizers, ball mills, sand mills, Attritor, basket mills, roll mills, and vibratory dispersers. In addition, if necessary, such as coarse particles can also be removed by passing them through such as strainers.

The aqueous resin composition, according to the present invention, is used in such a manner that: the composition is coated onto or soaked into a base material, and thereafter the aforementioned aqueous medium is removed by drying. For example, as soon as the aqueous resin composition according to the present invention is stuck to the base material, the aggregation of the aforementioned anionic resin and/or amphoteric resin with the aforementioned polyoxazoline compound occurs to extrude the aqueous medium out of the system, with the result that the excellent driability is displayed. And in the resin composition after the aqueous medium is removed, a complicated polymer matrix is formed by a stable covalent bond that is caused by a combination of the aforementioned anionic resin and/or amphoteric resin with the aforementioned multivalent metal compound, or a combination of the aforementioned anionic resin and/or amphoteric resin with the aforementioned polyoxazoline compound, and further, in the polymer matrix, the multivalent metal forms chelation with the anionic functional group and the oxazoline ring to fix them more firmly, with the result that a coating film displaying extremely excellent adhesion and resistance can be formed. Specifically, in the aqueous resin composition according to the present invention, there coexist the three components, namely, the anionic resin and/or amphoteric resin, the polyoxazoline compound, and the multivalent metal compound, whereby the excellent driability is displayed, and besides, the extremely excellent adhesion and resistance due to synergy of the three components can be caused.

The base material, which can be coated or soaked with the aqueous resin composition according to the present invention, is not especially limited, but examples thereof include: organic base materials, such as olefin resins (e.g. polyethylene and polypropylene), polystyrene resins, nylon, polyester resins (e.g. PET), cellophanes, vinyl chloride resins, and vinylidene chloride resins; paper base materials, such as fine quality papers, kraft papers, crepe papers, glassine papers, and plastic-coated papers; inorganic base materials, such as metals (e.g. iron, aluminum, and copper), glasses, concretes, cements, bricks, and gypsum boards; bitumen; cinder blocks; particle boards; woods; cellulose fibers, such as hemp, cotton, layon, and cupro; protein fibers, such as wool, animal hair, and silk; semi-synthetic fibers such as acetates; synthetic fibers, such as nylon, polyester, polyacrylonitrile, and vinylon; inorganic fibers, such as rock wool and glass fibers; and leathers. The forms of these base materials are not especially limited, but examples thereof include films, sheets, molded products, foamed structures, cords, and fiber-processed products, such as nonwoven fabrics and cloths. In addition, methods for coating or soaking with the aqueous resin composition according to the present invention are not especially limited, but publicly known methods (e.g. knife coating, comma coating, slot-die coating, slide-die coating, air-knife coating, blade coating, bar coating, kiss coating, spray coating, air-spray coating, roll coating, brush coating, curtain coating, flood coating, and dipping coating) or apparatuses can be applied thereto.

The aqueous resin composition, according to the present invention, displays good driability even under a mild drying condition of from room temperature to 80° C., and besides, the resultant coating film is excellent in: the adhesion to various base materials such as plastics; the water resistance; the solvent resistance; and the strength. Therefore, the aqueous resin composition, according to the present invention, displays practical resistances (e.g. friction resistance, blocking resistance, washing resistance, water-resisting strength, water-resisting adhesion, resistance to chemicals) and good workability, and can favorably be used, in a wide range of uses, such as: various inks (e.g. ink for flexography, ink for ink jet printers); various clear coating agents (e.g. OP varnish, film coating agents); receiving-layers of receiving-paper for ink jet printers; various paints (e.g. paints for traffic signs on road surfaces, conductive paints, paints for plastics, paints for inorganic building materials, paints for metals, paints for leathers, and repair paints); primers to organic base materials, inorganic base materials, or base materials difficult to adhere to; various fiber-treating agents (e.g. nonwoven-fabric binders, binders for printing pigments binders for water-repelling or finishing treatment, woven-fabric coating agents, and binders for soak-treatment); various adhesives (e.g. adhesives for various laminates such as dry laminates and extrusive laminates, adhesives for wood, adhesives for structures); antistatic agents; primers; top coating agents; pressure-sensitive adhesives; and various cosmetics (e.g. nail polishes and hair-dressing agents).

EFFECTS AND ADVANTAGE OF THE INVENTION

The present invention can provide an aqueous resin composition, which has good driability, and which is excellent in adhesion and various resistances, particularly, water and solvent resistances.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the examples of some preferred embodiments. Incidentally, unless otherwise noted, the units "part (s)" and "%" as mentioned in the examples and the comparative examples denote those by weight.

EXAMPLE 1

At first, 34.0 parts of a water-dispersible anionic resin A (styrene-acrylic resin, having an acid value of 55 mg KOH/g-solid, a Tg of 37° C., and a solid content of 46%), 1.6 parts of a water-soluble oxazoline compound B (having an oxazoline value of 220 g-solid/eq. and a solid content of 25%), 3.3 parts of ammonium zirconium carbonate (having a solid content of 46% (20% in terms of zirconium oxide)), and 19.1 parts of water were weighed out into a disperser, and they were stirred with the disperser for 5 minutes at 2,000 rpm, thus obtaining a resin composition having a total solid content of 30%.

The resin composition as obtained was used for various evaluations that were carried out by the following methods. The results are shown in Table 1.

(Coating film appearance): The resultant resin composition was coated onto an OPP film (which had been treated with corona discharge) with a bar coater so that the thickness of the resulting solid deposit would be about 1 μm, and thereafter, aging was carried out at 30° C., 60% RH for 24 hours, thus obtaining a test film. Then, the appearance of the coating film of the above test film was observed with the eye and evaluated on the following standard:

○: There were no appearance defects. X: There were appearance defects.

(Finger-touch driability): The resultant resin composition was coated onto a glass plate with a bar coater so that the thickness of the resulting solid deposit would be about 1 μm. Then, just after the above coating step, the coating film surface was pushed with a finger to measure how long time passed until no fingerprint was left. The evaluation was made on the following standard:

○: The time was shorter than 30 seconds. Δ: The time was shorter than 1 minute. X: The time was not shorter than 1 minute.

(Adhesion): A pressure sensitive adhesive tape having a width of 12 mm was stuck to the coating film surface of the test film as obtained for the above evaluation of the coating film appearance, and then the tape was forcibly peeled off to observe with the eye whether the coating film peeled off from the OPP film or not. The evaluation was made on the following standard:

○: Not peeled off. X: Peeled off.

(Water-rubbing resistance): Cotton wool which had been immersed into water was allowed to go back and forth 200 times on the coating film of the test film (as obtained for the above evaluation of the coating film appearance) with a Gakushin-type friction colorfastness testing machine to measure the number of times of the going back and forth as needed for a change of the coating film. The evaluation was made on the following standard:

A: No change was seen even in 200 times. B: A change was seen in 100–200 times, exclusive of 200 times. C: A change was seen in less than 100 times.

(Alcohol-rubbing resistance): A cotton stick which had been immersed into 80% ethanol was allowed to go back and forth 30 times on the coating film of the test film (as obtained for the above evaluation of the coating film appearance) to observe with the eye the coating film appearance. The evaluation was made on the following standard:

○: No change was seen. Δ: A few scratches were seen. X: Entire peeling off was seen.

EXAMPLE 2

A resin composition having a total solid content of 30% was obtained in the same way as of Example 1 except that the combining components as used in Example 1 were used in the combining ratios as shown in Table 1 respectively.

The resin composition as obtained was used, and various tests were carried out in the same way as of Example 1. The results are shown in Table 1.

EXAMPLE 3

A resin composition having a total solid content of 30% was obtained in the same way as of Example 1 except that a water-soluble anionic resin A (styrene-acrylic resin, having a weight-average molecular weight of 12,000, an acid value of 195 mg KOH/g-solid, a Tg of 70° C., and a solid content of 30%) and the combining components as used in Example 1 were used in the combining ratios as shown in Table 1 respectively.

The resin composition as obtained was used, and various tests were carried out in the same way as of Example 1. The results are shown in Table 1.

EXAMPLE 4

A resin composition having a total solid content of 30% was obtained in the same way as of Example 1 except that a water-soluble anionic resin A (styrene-acrylic resin, having a weight-average molecular weight of 12,000, an acid value of 195 mg KOH/g-solid, a Tg of 70° C., and a solid content of 30%), a propylene-oxide-modified polyethylenimine A (having had a number-average molecular weight of 600 before modified, and having a modification ratio of 100 mol % and a solid content of 50%), and the combining components as used in Example 1 were used in the combining ratios as shown in Table 1 respectively.

The resin composition as obtained was used, and various tests were carried out in the same way as of Example 1. The results are shown in Table 1.

Comparative Example 1 to 3

Resin compositions having a total solid content of 30% were obtained respectively in the same way as of Example 1 except that components as selected from among the combining components as used in Examples 1 to 4 were used in the combining ratios as shown in Table 1.

The resin compositions as obtained were used, and various tests were carried out in the same way as of Example 1. The results are shown in Table 1.

disperser for 5 minutes at 2,000 rpm, thus obtaining a resin composition having a total solid content of 40%.

The resin composition as obtained was used for various evaluations that were carried out by the following methods. The results are shown in Table 2.

(Water resistance 1): The resultant resin composition was coated onto a glass plate with a bar coater so that the thickness of the resulting solid deposit would be about 10 $\mu$m, and thereafter, aging was carried out at 23° C. and 65% RH for 24 hours, thus obtaining a test plate. Then, a glass cylinder having a diameter of 3 cm and a height of 3 cm was fixed on the coating film surface of the test plate with Vaseline and then charged with deionized water. After being left alone for 24 hours, the coating film appearance was observed with the eye and evaluated on the following standard:

○: No change was seen. Δ: A little whitening was seen. X: Whitening was seen.

(Water resistance 2): The test plate as obtained for the above evaluation of the water resistance 1 was further heated at 80° C. for 30 minutes. Then, in the same way as of the water resistance 1, the cylinder was fixed on the coating film surface of the test plate and then charged with deionized water. After being left alone for 24 hours, the coating film appearance was observed with the eye and evaluated on the following standard:

○: No change was seen. Δ: A little whitening was seen. X: Whitening was seen.

(Solvent resistance 1): The resultant resin composition was coated onto a tetrafluoroethylene resin plate so that

TABLE 1

| | Example 1 | Example 2 | Example 3 | Example 4 | Comparative Example 1 | Comparative Example 2 | Comparative Example 3 |
|---|---|---|---|---|---|---|---|
| Combination parts by weight | | | | | | | |
| Water-soluble anionic resin A | — | — | 5.2 | 5.2 | — | — | — |
| Water-dispersible anionic resin A | 34.0 | 34.0 | 34.0 | 34.0 | 34.0 | 34.0 | 34.0 |
| Water-soluble oxazoline compound A* | 1.6 | 6.4 | 1.6 | 1.2 | 1.6 | — | — |
| Polyethylenimine A | — | — | — | 0.2 | — | — | 3.2 |
| Ammonium zirconium carbonate | 3.3 | 3.3 | 3.3 | 3.3 | — | 3.3 | 3.3 |
| Water | 19.1 | 18.3 | 18.9 | 19.1 | 17.4 | — | 21.5 |
| Coating film appearance | ○ | ○ | ○ | ○ | Δ | X | ○ |
| Finger-touch driability | Δ | Δ | Δ | ○ | Δ | X | Δ |
| Adhesion | ○ | ○ | ○ | ○ | ○ | ○ | ○ |
| Water-rubbing resistance | ○ | ○ | ○ | ○ | ○ | ○ | X |
| Alcohol-rubbing resistance | ○ | ○ | Δ | Δ | X | X | X |

*: Solid content of 25%

EXAMPLE 5

At first, 100.0 parts of a water-dispersible anionic resin B (styrene-acrylic resin, having an acid value of 31 mg KOH/g-solid, a Tg of −5° C., and a solid content of 40%), 5.0 parts of a water-soluble oxazoline compound A (having an oxazoline value of 220 g-solid/eq. and a solid content of 40%), and 2.0 parts of ammonium zirconium carbonate (having a solid content of 46% (20% in terms of zirconium oxide)) were weighed out into a disperser, and they were stirred with the the thickness of the resulting solid deposit would be about 300 $\mu$m, and thereafter, aging was carried out at 23° C. and 65% RH for 24 hours, thus obtaining a test film. After the test film as obtained was immersed into xylene (methyl ethyl ketone in the cases of Example 9 and Comparative Example 7) for 24 hours, it was dried at 140° C. for 2 hours, and then the weight-swelling ratio was calculated from the weights of the test film before and after the above immersing and the weight of the test film after the above immersing and drying in accordance with the following equation:

Weight-swelling ratio (%)=[(weight after immersing−weight before immersing)/weight after immersing and drying]×100

(Solvent resistance 2): The test film as obtained for the above evaluation of the solvent resistance 1 was further heated at 80° C. for 30 minutes. Then, in the same way as of the solvent resistance 1, it was immersed into xylene (methyl ethyl ketone in the cases of Example 9 and Comparative Example 7) and thereafter dried. Then, the weight-swelling ratio was calculated from the weights of the test film before and after the above immersing and the weight of the test film after the above immersing and drying.

(Alcohol-rubbing resistance):

The test plate as obtained for the above evaluation of the water resistance 1 was further heated at 80° C. for 30 minutes. Then, a cotton stick which had been immersed into ethanol was allowed to go back and forth 50 times on the coating film of the test plate to observe with the eye the coating film appearance. The evaluation was made on the following standard:

○: No change was seen. Δ: A few scratches were seen. X: Entire elution was seen.

(Methyl-ethyl-ketone-rubbing resistance): The test plate as obtained for the above evaluation of the water resistance 1 was further heated at 80° C. for 30 minutes. Then, a cotton stick which had been immersed into methyl ethyl ketone was allowed to go back and forth 50 times on the coating film of the test plate to observe with the eye the coating film appearance. The evaluation was made on the following standard:

○: No change was seen. Δ: A few scratches were seen. X: Entire elution was seen.

(Adhesion): The resultant resin composition was coated onto various plastic base materials (PET, ABS, and polycarbonate (PC)) with a bar coater so that the thickness of the resulting solid deposit would be about 5 μm, and thereafter, aging was carried out at 23° C. and 65% RH for 24 hours, thus obtaining test plates. The coating films of the test plate as obtained were cut into checkerboard squares by a cross cut gauge, and a pressure sensitive adhesive tape having a width of 12 mm was stuck to the cut faces, and thereafter the tape was forcibly peeled off to observe with the eye whether the coating films peeled off from the base materials or not.

The evaluation was made on the following standard:

○: Not peeled off. X: Peeled off.

(Measurement of film fracture strength): The resultant resin composition was coated onto a tetrafluoroethylene resin plate so that the thickness of the resulting solid deposit would be about 300 μm, and thereafter, aging was carried out at 23° C. and 65% RH for 24 hours and then further heated at 80° C. for 30 minutes, thus obtaining a test film. The test film as obtained was cut into strips of 1 cm×4 cm to measure the fracture strength at a tensile speed of 5 cm/minute with an Instron universal material testing machine (produced by Instron Corporation).

(Driability): The resultant resin composition was coated onto a glass plate with a bar coater so that the thickness of the resulting solid deposit would be about 5 μm. Then, drops of water were continuously dropped onto the coated surface. How long time passed since just after the coating until no whitening of the coating film by the water dropping onto the coated surface was seen was measured with the eye to evaluate the water resistance on the following standard:

○: The time was within 10 minutes. Δ: The time was in the range of 10 to 30 minutes (both exclusive). X: The time was not shorter than 30 minutes.

EXAMPLE 6

A resin composition having a total solid content of 39% was obtained in the same way as of Example 5 except that a water-soluble anionic resin A (styrene-acrylic resin, having a weight-average molecular weight of 12,000, an acid value of 195 mg KOH/g-solid, a Tg of 70° C., and a solid content of 30%) and the combining components as used in Example 5 were used in the combining ratios as shown in Table 2 respectively.

The resin composition as obtained was used, and various tests were carried out in the same way as of Example 5. The results are shown in Table 2.

EXAMPLE 7

A resin composition having a total solid content of 40% was obtained in the same way as of Example 5 except that a water-dispersible oxazoline compound A (having an oxazoline value of 550 g-solid/eq. and a solid content of 40%) and components as selected from among the combining components as used in Example 5 were used in the combining ratios as shown in Table 2 respectively.

The resin composition as obtained was used, and various tests were carried out in the same way as of Example 5. The results are shown in Table 2.

EXAMPLE 8

A resin composition having a total solid content of 40% was obtained in the same way as of Example 7 except that the combining components as used in Example 7 were used in the combining ratios as shown in Table 2.

The resin composition as obtained was used, and various tests were carried out in the same way as of Example 5. The results are shown in Table 2.

EXAMPLE 9

A resin composition having a total solid content of 38% was obtained in the same way as of Example 5 except that a water-dispersible anionic resin C (urethane resin, having an acid value of 26 mg KOH/g-solid and a solid content of 38%) components as selected from among the combining components as used in Example 5 were used in the combining ratios as shown in Table 2 respectively.

The resin composition as obtained was used, and various tests were carried out in the same way as of Example 5. The results are shown in Table 2.

(Comparative Examples 4 to 6

Resin compositions having a total solid content of 40% were obtained respectively in the same way as of Example 5 except that a propylene-oxide-modified polyethylenimine A (having had a number-average molecular weight of 600 before modified, and having a modification ratio of 100 mol % and a solid content of 50%) and components as selected from among the combining components as used in Example 5 were used in the combining ratios as shown in Table 3 respectively.

The resin compositions as obtained were used, and various tests were carried out in the same way as of Example 5. The results are shown in Table 3.

Comparative Examples 7 and 8

Resin compositions having a total solid content of 38% were obtained respectively in the same way as of Example 5 except that components as selected from among the combining components as used in Examples 5 and 9 were used in the combining ratios as shown in Table 3 respectively.

The resin compositions as obtained were used, and various tests were carried out in the same way as of Example 5. The results are shown in Table 3.

(Comparative Example 9)

A resin composition having a total solid content of 40% was obtained in the same way as of Example 5 except that components as selected from among the combining components as used in Example 5 were used in the combining ratios as shown in Table 3 respectively.

The resin composition as obtained was used, and various tests were carried out in the same way as of Example 5. The results are shown in Table 3.

TABLE 2

| | | Example 5 | Example 6 | Example 7 | Example 8 | Example 9 |
|---|---|---|---|---|---|---|
| Combination parts by weight | Water-dispersible anionic resin B | 100.0 | 100.0 | 100.0 | 100.0 | — |
| | Water-dispersible anionic resin C | — | — | — | — | 100.0 |
| | Water-soluble anionic resin A | — | 19.2 | — | — | — |
| | Water-soluble oxazoline compound A * | 5.0 | 5.0 | — | — | 4.9 |
| | Water-dispersible oxazoline compound A | — | — | 5.0 | 12.5 | — |
| | Polyethylenimine A | — | — | — | — | — |
| | Ammonium zirconium carbonate | 2.0 | 2.0 | 2.0 | 2.0 | 1.9 |
| | Water resistance 1 | ○ | Δ | ○ | ○ | ○ |
| | Water resistance 2 | ○ | ○ | ○ | ○ | X |
| | Solvent resistance 1 (%) | 703 | 570 | 770 | 735 | 880 |
| | Solvent resistance 2 (%) | 431 | 357 | 615 | 508 | 570 |
| | Methyl-ethyl-ketone-rubbing resistance | Δ | Δ | Δ | Δ | Δ |
| | Alcohol-rubbing resistance | ○ | Δ | Δ | Δ | ○ |
| Adhesion | PET | ○ | — | ○ | ○ | — |
| | ABS | ○ | — | ○ | ○ | — |
| | PC | ○ | — | ○ | ○ | — |
| | Film fracture strength (MPa) | 122 | — | — | — | — |
| | Driability | ○ | — | ○ | ○ | — |

* : Solid content of 40%

TABLE 3

| | Comparative Example 4 | Comparative Example 5 | Comparative Example 6 | Comparative Example 7 | Comparative Example 8 | Comparative Example 9 |
|---|---|---|---|---|---|---|
| Combination parts by weight | | | | | | |
| Water-dispersible anionic resin B | 100.0 | 100.0 | 100.0 | — | 100.0 | 100.0 |
| Water-dispersible anionic resin C | — | — | — | 100.0 | — | — |
| Water-soluble anionic resin A | — | — | — | — | — | — |
| Water-soluble oxazoline compound A * | — | — | — | 4.9 | 5.0 | — |
| Water-dispersible oxazoline compound A | 5.0 | 12.5 | — | — | — | — |
| Polyethylenimine A | — | — | 3.0 | — | — | — |
| Ammonium zirconium carbonate | — | — | 2.0 | — | — | 2.0 |
| Water resistance 1 | Δ | Δ | X | X | ○ | X |
| Water resistance 2 | Δ | Δ | Δ | X | ○ | ○ |
| Solvent resistance 1 (%) | 2745 | 2023 | 891 | dissolved | 2330 | 798 |
| Solvent resistance 2 (%) | 1732 | 941 | 626 | 837 | 690 | 725 |
| Methyl-ethyl-ketone-rubbing resistance | X | X | X | Δ | Δ | Δ |
| Alcohol-rubbing resistance | X | X | Δ | Δ | Δ | Δ |
| Adhesion | | | | | | |
| PET | X | X | — | — | X | X |
| ABS | X | X | — | — | X | X |
| PC | X | X | — | — | X | X |
| Film fracture strength (MPa) | — | — | — | — | 97 | 90 |
| Driability | X | X | — | — | X | ○ |

*: Solid content of 40%

EXAMPLE 10

At first, 34.0 parts of a water-dispersible amphoteric resin A (having an acid value of 47 mg KOH/g-solid, an amino hydrogen equivalent of 650 g-solid/eq., and a solid content of 38%), 1.6 parts of a water-soluble oxazoline compound B (having an oxazoline value of 220 g-solid/eq. and a solid content of 25%), 6.6 parts of ammonium zirconium carbonate (having a solid content of 46% (20% in terms of zirconium oxide)), and 12.8 parts of water were weighed out into a disperser, and they were stirred with the disperser for 5 minutes at 2,000 rpm, thus obtaining a resin composition having a total solid content of 30%.

The resin composition as obtained was used for various evaluations that were carried out by the following methods. The results are shown in Table 4.

(Coating film appearance): The resultant resin composition was coated onto an OPP film (which had been treated with corona discharge) with a bar coater so that the thickness of the resulting solid deposit would be about 1 μm, and thereafter heated at 80° C. for 1 minute, thus obtaining a test film. Then, the appearance of the coating film of the above test film was observed with the eye and evaluated on the following standard:

○: There were no appearance defects. X: There were appearance defects.

(Adhesion): A pressure sensitive adhesive tape having a width of 12 mm was stuck to the coating film surface of the test film as obtained for the above evaluation of the coating film appearance, and then the tape was forcibly peeled off to observe with the eye whether the coating film peeled off from the OPP film or not. The evaluation was made on the following standard:

○: Not peeled off. X: Peeled off.

(Water-rubbing resistance): Cotton wool which had been immersed into water was allowed to go back and forth 200 times on the coating film of the test film (as obtained for the above evaluation of the coating film appearance) with a Gakushin-type friction colorfastness testing machine to measure the number of times of the going back and forth as needed for a change of the coating film. The evaluation was made on the following standard:

A: No change was seen even in 200 times. B: A change was seen in 100–200 times, exclusive of 200 times. C: A change was seen in less than 100 times.

(Alcohol resistance): After the test film as obtained for the above evaluation of the coating film appearance was immersed into 80% ethanol for 5 minutes, the coating film appearance was observed with the eye to make evaluation on the following standard:

○: No change was seen. X: Whitening or elution was seen.

EXAMPLE 11

A resin composition having a total solid content of 30% was obtained in the same way as of Example 10 except that a water-dispersible oxazoline compound A (having an oxazoline value of 550 g-solid/eq. and a solid content of 40%) and components as selected from among the combining components as used in Example 10 were used in the combining ratios as shown in Table 4 respectively.

The resin composition as obtained was used, and various tests were carried out in the same way as of Example 10. The results are shown in Table 4.

EXAMPLE 12

A resin composition having a total solid content of 30% was obtained in the same way as of Example 10 except that a water-dispersible anionic resin A (styrene-acrylic resin, having an acid value of 55 mg KOH/g-solid, a Tg of 37° C., and a solid content of 46%) and components as selected from among the combining components as used in Example 10 were used in the combining ratios as shown in Table 4 respectively.

The resin composition as obtained was used, and various tests were carried out in the same way as of Example 10. The results are shown in Table 4.

Comparative Example 10

A resin composition having a total solid content of 30% was obtained in the same way as of Example 10 except that components as selected from among the combining components as used in Example 10 were used in the combining ratios as shown in Table 4.

The resin composition as obtained was used, and various tests were carried out in the same way as of Example 1. The results are shown in Table 4.

TABLE 4

| | | Example 10 | Example 11 | Example 12 | Comparative Example 10 |
|---|---|---|---|---|---|
| Combination parts by weight | Water-dispersible anionic resin A | — | — | 17.0 | — |
| | Water-soluble oxazoline compound A * | 1.6 | — | 1.6 | — |
| | Water-dispersible oxazoline compound A | — | 1.0 | — | — |
| | Water-dispersible amphoteric resin A | 34.0 | 34.0 | 17.0 | 34.0 |
| | Ammonium zirconium carbonate | 6.6 | 6.6 | 6.6 | — |
| | Water | 12.8 | 13.4 | 15.8 | 10.0 |
| | Coating film appearance | ○ | ○ | ○ | ○ |
| | Adhesion | ○ | ○ | ○ | X |
| | Water-rubbing resistance | ○ | ○ | ○ | X |
| | Alcohol resistance | ○ | ○ | ○ | X |

*: Solid content of 25%

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous resin composition, which comprises a combination of: an anionic resin and/or an amphoteric resin; a polyoxazoline compound; and a multivalent metal compound.

2. An aqueous resin composition according to claim 1, wherein the multivalent metal compound is a zirconium compound.

3. An aqueous resin composition according to claim 1, wherein the combination further includes a volatile basic compound.

4. An aqueous resin composition according to claim 2, wherein the combination further includes a volatile basic compound.

* * * * *